US012709959B2

(12) United States Patent
Elkhoury et al.

(10) Patent No.: US 12,709,959 B2
(45) Date of Patent: Aug. 18, 2026

(54) SYSTEM AND METHOD FOR LEAK PREVENTION

(71) Applicant: Schlumberger Technology Corporation, Sugar Land, TX (US)

(72) Inventors: Jean Elkhoury, Cambridge, MA (US); Sharath Chandra Mahavadi, Cambridge, MA (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 19/295,251

(22) Filed: Aug. 8, 2025

(65) Prior Publication Data

US 2026/0043307 A1 Feb. 12, 2026

Related U.S. Application Data

(60) Provisional application No. 63/682,048, filed on Aug. 12, 2024.

(51) Int. Cl.
*E21B 33/128* (2006.01)
*C09K 8/42* (2006.01)
*C09K 8/46* (2006.01)
*E21B 33/138* (2006.01)

(52) U.S. Cl.
CPC ............ *E21B 33/138* (2013.01); *C09K 8/424* (2013.01); *C09K 8/46* (2013.01); *C09K 2208/10* (2013.01)

(58) Field of Classification Search
CPC ......... E21B 33/138; C09K 8/424; C09K 8/46; C09K 2208/10
See application file for complete search history.

(56) References Cited

U.S. PATENT DOCUMENTS

| | | | | |
|---|---|---|---|---|
| 5,404,951 | A * | 4/1995 | Lai | C09K 8/5086 166/295 |
| 11,111,181 | B2 | 9/2021 | Clausen | |
| 2019/0316025 | A1* | 10/2019 | Sherman | C09K 8/5045 |
| 2019/0383115 | A1* | 12/2019 | Lees | C09K 8/424 |
| 2020/0407275 | A1 | 12/2020 | Kvassnes | |
| 2021/0222512 | A1* | 7/2021 | Pearl, Jr. | E21B 33/138 |
| 2022/0010192 | A1* | 1/2022 | Lewis | C09K 8/40 |
| 2022/0169907 | A1* | 6/2022 | Gillies | C09K 8/40 |

OTHER PUBLICATIONS

Kutchko, B. G. et al., "Rate of CO2 Attack on Hydrated Class H Well Cement Under Geologic Sequestration Conditions", Environmental Science Technology, 2008, 42(16), pp. 6237-6242.

Carey, J. W. et al., "Analysis and performance of oil well cement with 30 years of CO2 exposure from the SACROC Unit, West Texas, USA", International Journal of Greenhouse Gas Control, 2007, 1(1), pp. 75-85.

Todorovic, J. et al., "Remediation of Leakage through Annular Cement Using a Polymer Resin: A Laboratory Study", Energy Procedia, 2016, 86, pp. 442-449.

* cited by examiner

*Primary Examiner* — Yong-Suk (Philip) Ro
(74) *Attorney, Agent, or Firm* — Jeffrey D. Frantz

(57) ABSTRACT

A well cementing system may flow a carrier fluid into an annulus defined between an outer surface of a casing and a wellbore wall, the carrier fluid including reactive particles having a particle size between 1 nm and 1 μm. A well cementing system may coat at least a portion of an annular surface of the annulus with the reactive particles, the reactive particles formulated and configured to react with a reactant in the annulus to cause the reactive particles to increase in volume.

11 Claims, 7 Drawing Sheets

SYSTEM AND METHOD FOR LEAK PREVENTION

CROSS-REFERENCE TO RELATED APPLICATIONS

The present application claims priority to and the benefit of U.S. Provisional Patent Application Ser. No. 63/682,048 filed Aug. 12, 2024, the disclosure of which is incorporated herein by reference in its entirety.

BACKGROUND OF THE DISCLOSURE

In general, different classes and types of Portland cement with a variety of additives are used in downhole cementation operations. A variety of classes with a large catalog of additives exists in the literature. These additives can be tuned and selected based on specific operational conditions and requirements. For example, the addition of magnesium oxide (or calcium oxide) can serve as a high temperature expansion agent. Other additives such as accelerators will speed up the thickening time of the cement mix, while fibrous material increases the tensile strength to set cement.

Degradation of alkaline-based cement sheath is a severe problem in subsurface carbon sequestration operations. One contributor to the degradation of cement, when exposed to carbon dioxide ($CO_2$) (and $CO_2$-rich fluids) is due to the extent of which the hydrogen ions react with the calcium-silicate-hydrate (C—S—H) and calcium hydroxide ($Ca(OH)_2$) of the alkaline-based cement mix. These reactions lead to the degradation of the cement expressed by a loss in the structural integrity as well as an increase in permeability and porosity.

Moreover, under reservoir conditions, cement degradation leads to the developing of fissures, providing potential $CO_2$ leakage pathways. Conventional systems typically alter the cement formulation by adding various additives at different concentrations that could potentially suit the purpose of the application. But such additives to the cement may not prevent the leakage of gas or $CO_2$ through the interface between cement and casing or formation due to the de-bonding of these interfaces. Indeed, $CO_2$ may leak from a wellbore through micro annuli at the casing, the interface between the cement and casing, the cement, the interface between the cement and the formation, and combinations thereof. Such micro annuli may be formed based on the extensive reactivity of $CO_2$ with the cement at these interfaces. In some situations, the debonding of these interfaces may be mitigated through squeeze cementing, and/or temperature activated polymers (e.g., resins) has been examined in a laboratory setting. However, upscaling this process to a field operation is impractical due to the need of critical data or information on the shape of the leak zone to perform such poly-resin squeeze operation. Further, such solutions are reactive, and rely on detection and mitigation of leaks, after which a potentially significant amount of $CO_2$ or other contaminant has been released.

These studies and practical situations in the field clearly demonstrate the need for a process/method to prevent such leaks for the long-term success of, for example, subsurface carbon sequestration.

SUMMARY

In some aspects, the techniques described herein relate to a method for annular crack mitigation in a wellbore. A well cementing system flows a carrier fluid into an annulus defined between an outer surface of a casing and a wellbore wall. The carrier fluid includes reactive particles having a particle size between 1 nm and 1 μm. The well cementing system coats at least a portion of an annular surface of the annulus with the reactive particles. The reactive particles are formulated and configured to react with a reactant in the annulus to cause the reactive particles to increase in volume.

In some aspects, the techniques described herein relate to a well cementing system. The well cementing system includes a spacer fluid configured to be pumped into an annular space between a wellbore wall and a casing. Reactive particles are mixed into the spacer fluid for coating an outer surface of the casing and a wellbore wall of a wellbore. The reactive particles include an average particle size of less than 1 μm.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2-1 through FIG. 2-3 include a representation of a well cementing system, according to at least one embodiment of the present disclosure.

FIG. 3 is a representation of a well cementing system, according to at least one embodiment of the present disclosure.

DETAILED DESCRIPTION

Figure 1:
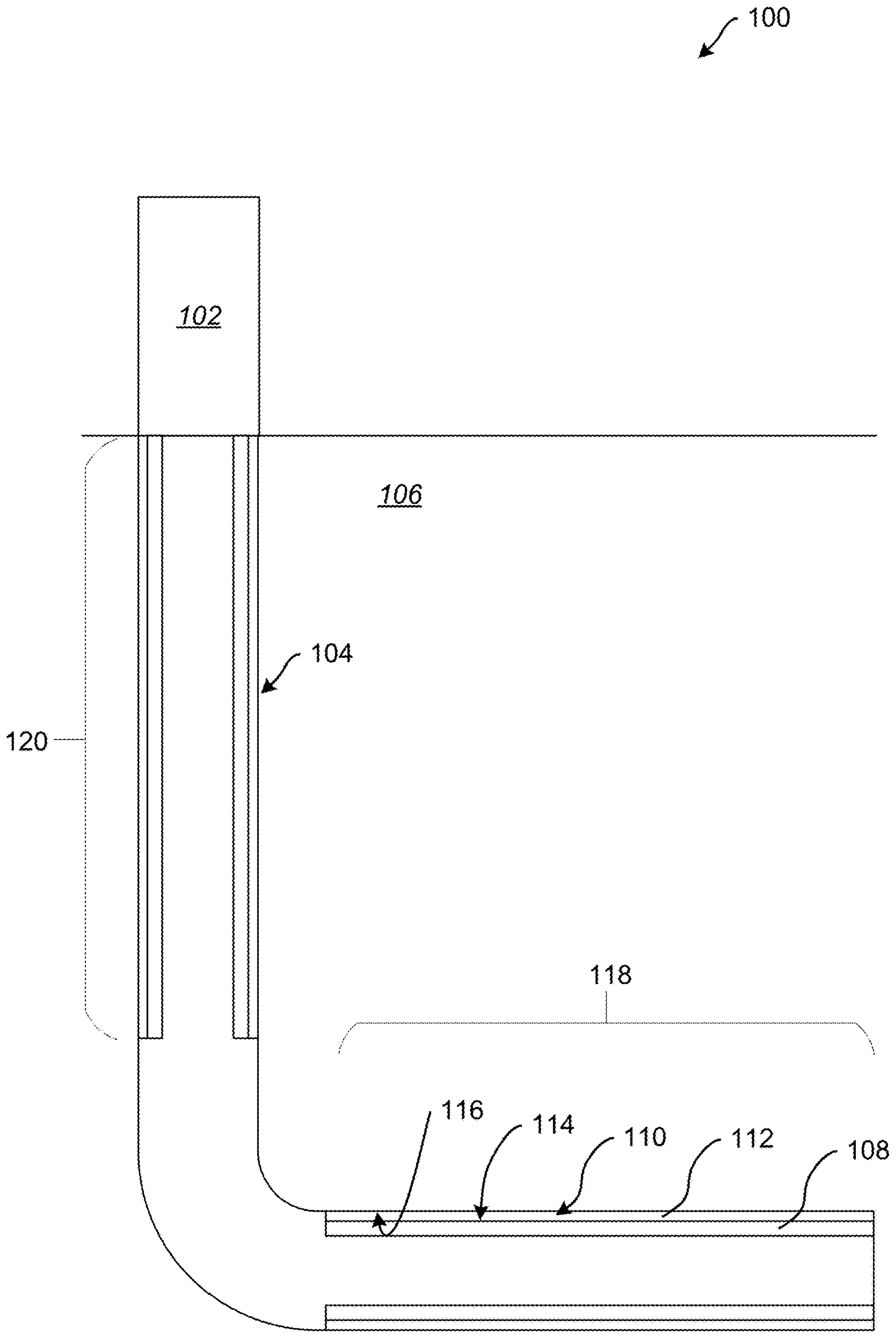
FIG. 1 is a schematic representation of a well cementing system, according to at least one embodiment of the present disclosure.

In summary, the present invention discloses a workflow and a method for well conditioning during downhole cementing operation of casing in subsurface fluid production or injection operations. As discussed herein, during operation of a wellbore, the casing and/or cement liner in an annulus between the casing and the formation may corrode or degrade, forming cracks and micro annuli. Gas may escape the wellbore through these cracks and micro annuli. While embodiments of the present disclosure may be described with respect to $CO_2$, it should be understood that the techniques of the present disclosure may be applied to any reactant in a wellbore. For example, different wellbores may include different reactants that may cause corrosion and/or degradation of the casing, the cement, and/or the interface between the casing, the cement, and the formation. Such reactants may include $CO_2$, sulfur compounds (e.g., hydrogen sulfide ($H_2S$)), salts, alkaline compounds, acidic compounds, gas impurities, VOCs, any other reactant or impurity, and combinations thereof.

In accordance with at least one embodiment of the present disclosure, the wellbore conditioning may include applying a coating of reactive particles to the annular surfaces in the annulus between the casing and the wellbore wall. The reactive particles may be selected and formulated to react with a reactant in the wellbore. Reaction with the reactant may cause the reactive particles to swell in size. Swelling of the reactive particles may close or partially close the cracks, micro annuli, and other openings in the annulus between the casing and the wellbore wall. In this manner, the reactive particles may facilitate the closing of the micro annuli and cracks as they form or shortly thereafter. For example, when a micro annulus or crack forms, the reactant may infiltrate the open space. The infiltrating reactant may undergo a chemical reaction with the reactive particles. The chemical reaction may change the reactive particles to reacted particles. The reacted particles may have a larger volume than the reactive particles. In this manner, as the reactive particles react with the reactant to form the reacted particles, the increase in volume may fill or at least partially fill the void space in the cracks or micro annuli. In some embodiments, the increase in volume may close off the void space such that the contaminants may not flow out of the wellbore. In some embodiments, the increase in volume may completely fill the void space.

In accordance with at least one embodiment of the present disclosure, in a wellbore having a high concentration of $CO_2$, the reactive particles may be formed from a material that is reactive with $CO_2$. As a specific, non-limiting example, the reactive particles may include a magnesium-iron silicate, such as a silicate of the olivine family. When $CO_2$ contacts the olivine silicates, the olivine silicates may react with the $CO_2$ to form carbonates and other secondary minerals. But as discussed in further detail herein, the reactive particles may be selected and formulated to react with any other reactant in a particular wellbore. Examples of other reactive particles may include wollastonite ($CaSiO_3$), or Brucite ($Mg(OH)_2$).

During the conditioning of the wellbore, the reactive particles may be injected into the wellbore. For example, the reactive particles may be mixed in a carrier fluid, such as a spacer fluid used during cementing of the casing. In some embodiments, the reactive particle impregnated spacer fluid may be flowed through the annulus prior to cement injection. After flowing, the spacer fluid may leave a shielding layer (e.g., a coating) of reactive particles that may react with leaked reactant at the annular surfaces, such as at interfaces of the cement sheath between the cement and formation as well as cement and casing or in other words leaks through micro annuli. In this manner, the reactive particles may reduce leakage pathways at the inner and outer perimeter of the sheath, as the reacting particles may cause mineral precipitation that reduces porosity and permeability.

In some embodiments, the reactive particles may be injected into the wellbore after casing the wellbore. For example, the reactive particles in a carrier fluid may be injected into the wellbore after perforation. This may facilitate shielding of the wellbore from the formation of leakage pathways and reduce permeability around the perforation zone. In some examples, the reactive particles in the carrier fluid may be injected into the wellbore after the detection of a leak of the reactant.

As discussed in further detail herein, the reactive particles may be formed with various particle sizes and/or shapes. For example, the reactive particles may be formed on the nanometer scale and/or the micrometer scale. In accordance with at least one embodiment of the present disclosure, the micro particles may have an average particle size of less than 1 μm. In some embodiments, the reactive particles may be formed from various shapes, such as spherical, ovoid, pyramidal, cuboid, or other 3-dimensional shape. In some embodiments, the particle size range and/or shape distribution of the reactive particles may be selected based on the details of the wellbore, such as casing type, cement type, formation type, reactant type, contaminant type, and so forth. In this manner, the reactive particles may be tailored to the particular wellbore in which the reactive particles may be utilized.

FIG. 1 is a schematic representation of a well cementing system 100, according to at least one embodiment of the present disclosure. The well cementing system 100 illustrated includes an injection system 102 at the surface of a wellbore 104. The wellbore 104 extends into a formation 106. At least a portion of the wellbore 104 is lined with a casing 108. An annular space 110 between the casing 108 and the wellbore 104 may be filled with a cement liner 112. For example, the annular space 110 may be defined as the space between an outer surface 114 of the casing 108 and a wellbore wall 116 of the wellbore 104.

The well cementing system 100 may be located at any type of wellsite. For example, the well cementing system 100 may be located at an oil and gas production well. In some examples, the well cementing system 100 may be located at a $CO_2$ sequestration well. In some examples, the well cementing system 100 may be located at a water well. The wellbore 104 may include any type of fluid flowing therethrough. For example, the wellbore 104 may include fluids produced from the formation 106, such as water, oil and other hydrocarbons, natural gas, and combinations thereof. In some examples, the wellbore 104 may include fluids to be injected into the formation 106, such as fracking fluid, stimulants or other chemicals, $CO_2$, or any other fluid.

As discussed herein, the wellbore 104 may include various reactants. For example, the fluid in the wellbore 104 may include a reactant or other pollutant that may corrode or degrade the casing 108, the cement liner 112, or the interface, adhesion, or contact between the casing 108 and the cement liner 112 or the cement liner 112 and the formation 106. The reactant or pollutant may derive from any source. For example, the reactant or pollutant may flow into the wellbore 104 from the formation 106. In some examples, the reactant or pollutant may flow into the wellbore 104 from the injection system 102.

In some situations, the casing 108 may include one or more pathways for fluid to pass between the wellbore 104 and the formation 106. For example, the casing 108 may include one or more pathways for production fluids to pass from the formation 106, into the wellbore 104, and to the surface for collection and processing. In some examples, the casing 108 may include one or more pathways for injection fluids to pass into the formation 106, such as fracking fluids, stimulant chemicals, $CO_2$, and so forth. Such pathways may be formed via perforations, pre-formed in the casing 108, or otherwise formed in the casing 108.

The cement liner 112 in the annular space 110 between the casing 108 and the formation 106 may seal the interior of the wellbore 104 from the formation 106. This may facilitate the control of the passage of fluid between the wellbore 104 and the formation 106, such as by limiting the control of fluid passage to the pathways.

As the reactant or pollutant contacts the casing 108 and/or the cement liner 112, the reactant or pollutant may corrode or degrade the casing 108, cement liner 112, or the interfaces of the cement liner 112. The reactant or pollutant may come into contact with the cement liner 112 via the pathways discussed herein, or through damage to the casing 108, such as corrosion holes or other damage.

As discussed herein, the corrosion or degradation of the cement liner 112 and/or the casing 108 may result in the formation of micro annuli at the interface between the casing 108 and the cement liner 112. Such micro annuli may form void spaces through which the fluid in the wellbore 104 may pass. This may cause undesired migration of the fluid in the wellbore 104 into the formation 106, and indeed may cause fluid that is desired to be stored in the formation 106 to leak to the surface and the atmosphere. For example, $CO_2$ in the wellbore 104 may leak through the micro annuli or other cracks to the surface, which may increase the $CO_2$ pollution of the well cementing system 100 and/or reduce the effectiveness of the wellbore 104 as a $CO_2$ storage site.

In some embodiments, micro annuli and other cracks in the casing 108, the cement liner 112 and/or a debonding of the cement liner 112 between the casing 108 and/or the formation 106 may occur through other processes than corrosion or degradation caused by a reactant or pollutant in the fluids of the wellbore 104. Such mechanisms may include production or completion operations, such as perforation and/or fracking operations. In some examples, cracks and micro annuli may be formed based on fluid or geologic pressure, seismic activity (including low energy seismic activity), and so forth.

In accordance with at least one embodiment of the present disclosure, the formation of the micro annuli may expose reactive particles. The reactive particles may be formulated and selected to react with a reactant in the fluid that may pass through the micro annuli. For example, the reactive particles may be formulated and selected to react with the reactant to form new minerals or compounds. This reaction may cause the reactive particles to swell, or increase in volume. The swelling reactive particles may swell into the void space formed by the micro annuli. In accordance with at least one embodiment of the present disclosure, the swelling reactive particles may close off, partially fill, or fully fill the void space formed by the micro annuli. This may block the fluid pathway, thereby re-sealing the annular space 110 between the casing 108 and the formation 106.

The reactive particles may be deposited in the wellbore 104 in any manner. For example, the reactive particles may be mixed into a carrier fluid. The injection system 102 may inject the carrier fluid into the wellbore 104. For example, the injection system 102 may include one or more pumps that may pump the carrier fluid into the wellbore 104. Contact of the carrier fluid with the surfaces of the casing 108, the cement liner 112, and the formation 106 may deposit a coating of the carrier fluid, containing the reactive particles, on those surfaces.

The carrier fluid and the reactive particles may be injected into the wellbore 104 at any point in the lifetime of the wellbore 104. For example, the carrier fluid containing the reactive particles may be injected into the wellbore 104 during completion of the wellbore 104. In some examples, the carrier fluid may include a spacer fluid containing the reactive particles. The spacer fluid may be pumped into the wellbore 104 to fill the annular space 110 prior to pumping of the cement liner 112 into the annular space 110. For example, the spacer fluid may be pumped into the wellbore 104 to fill the annular space 110. Contact of the spacer fluid with the outer surface 114 of the casing 108 and the wellbore wall 116 may apply a coating of the spacer fluid containing the reactive particles on the outer surface 114 of the casing 108 and the wellbore wall 116. As the cement liner 112 is pumped into the wellbore 104 (such as via cement pumps at the injection system 102) and displaces the spacer fluid, the coating may remain, or at least some of the reactive particles may remain deposited on the outer surface 114 and the wellbore wall 116. When the micro annuli are formed, the deposited reactive particles may be exposed. As the fluid containing the reactant flows into the void space formed by the micro annuli, the reactive particles and reactant may react, causing the reactive particles to swell and fill the void space of the micro annuli. In this manner, the micro annuli may be filled or healed as they are formed.

In some embodiments, the carrier fluid may be pumped into the wellbore 104 after the cement liner 112 has been installed in the annular space 110. For example, the carrier fluid containing the reactive particles may be pumped into the wellbore 104 after micro annuli and/or other cracks have formed in the annular space 110. The carrier fluid may deposit the reactive particles on the annular surfaces of the annular space. The annular surfaces of the annular space may include any surface in the annular space 110. For example, the annular surfaces may include surfaces of the casing 108, the formation 106, and the cement liner 112, including surfaces that are parallel or approximately parallel to the wellbore 104 (e.g., parallel or approximately parallel to the axis of the wellbore 104) and surfaces that are perpendicular to the wellbore 104, or any orientation therebetween. As the micro annuli and cracks are filled with the fluid from the wellbore 104, the reactant may react with the reactive particles coated on the annular surfaces, thereby causing the reactive particles to swell and at least partially fill the micro annuli and cracks.

As discussed herein, the reactive particles may have a particle size. In some embodiments, the particle size may be the largest cross-sectional dimension of the reactive particles. In some embodiments, the particle size may be the smallest cross-sectional dimension of the reactive particles. In some embodiments, the particle size may be the average cross-sectional dimension of the reactive particles. In some embodiments, the particle size may be in a range having an upper value, a lower value, or upper and lower values including any of 1 nm, 5 nm, 10 nm, 50 nm, 100 nm, 500 nm, 1 μm, 5 μm, 10 μm, 50 μm, 100 μm, 500 μm, 1 mm, 5 mm or any value therebetween. For example, the particle size may be greater than 1 nm. In another example, the particle size may be less than 500 μm. In yet other examples, the particle size may be any value in a range between 1 nm and 5 mm. In some embodiments, it may be critical that the particle size is less than 1 μm to increase the surface area of the reactive particles, thereby increasing the reactivity, reaction speed, extent of reaction, and other reactive properties of the reactive particles. In some embodiments, all of the reactive particles injected into the wellbore 104 may have the same size. In some embodiments, the reactive particles injected into the wellbore 104 may have a range of sizes. In some embodiments, the particle sizes discussed herein may be the average particle size for the reactive particles injected in the wellbore 104.

As discussed herein, the reactive particles may have a particle shape. The particle shape may be the three-dimensional shape of the reactive particles. For example, the particle shape may include one or more of spherical, ovoid, spheroid, cuboid, cubic, pyramidal, irregular, or any other three-dimensional shape having any number of sides, edges, and vertices. In some examples, the particle shape may be the cross-sectional shape of the reactive particles, such as circular, oval, triangular, rectangular, cubic, irregular, polygonal having any number of sides, and so forth. In some embodiments, each of the reactive particles injected in the wellbore 104 may have the same particle shape. In some embodiments, the reactive particles injected in the wellbore 104 may have different shapes.

In accordance with at least one embodiment of the present disclosure, the reactive particles injected in the wellbore 104 may be tailored to the particular conditions of a particular wellbore 104. For example, the fluid of the wellbore 104 and/or the mineralogy of the formation 106 may have known contaminants, reactants, or other chemical composition. Further, the casing 108, cement liner 112, and formation 106 may have particular properties. The wellbore fluids and the wellbore components may interact, resulting in surface roughness and other features. The particle size and/or particle shape may be selected based on the fluid properties and/or component properties. For example, the particle size and/or shape may be selected based on pitting, scratching, or other surface features on the outer surface 114, the wall smoothness of the wellbore wall 116, the formation chemistry of the wellbore wall 116, the desired reactivity or reaction rate of the reactive particles with the wellbore fluid, and so forth. This may facilitate improved responsiveness and/or sealability of the reactive properties of the reactive particles.

In accordance with at least one embodiment of the present disclosure, different portions of the wellbore 104 may be coated with reactive particles having different properties. For example, a first section 118 of the wellbore 104 may include pathways across the casing 108, which may expose the cement liner 112 to the fluids of the wellbore 104. To account for the increased likelihood of the formation of micro annuli in the first section 118, the carrier fluid may have a relatively high concentration of the reactive particles. A second section 120 of the wellbore 104 may be fully cased with the casing 108. The carrier fluid coating the second section 120 may have a lower concentration than the carrier fluid for the first section 118. In this manner, the well cementing system 100 may tailor the coating and responsiveness of the wellbore 104 to the formation of micro annuli to the sections of the wellbore 104.

In some embodiments, and as discussed herein, conditioning the wellbore may include preparing the surfaces of the formation and the casing to systematically react with the reactant (such as $CO_2$) to prevent its potential leak through the wellbore. In this conditioning step, which may be performed prior to the cement injection, reactive particles of defined size (nano to micrometer (including 100's of microns) sized) and shape will be added to a compatible spacer fluid. In some embodiments, the reactive particles may be pumped into the wellbore 104 behind the spacer fluid and prior to the cement slurry.

In some embodiments, the reactive particles may coat the area of the micro annuli located between the formation and the cement, as well as between the casing and the cement. In some situations, nitrogen gas can be flushed through the wellbore right before the cement slurry. Flushing the nitrogen gas (or another inert gas) through the wellbore (including through the annular space 110) may facilitate particle adhesion to the desired surfaces. In this manner, the well cementing system 100 may coat the annular surfaces with different material in different layers or different coatings. For example, repeated cycles of pumping the reactive particles, flushing the wellbore with nitrogen, and pumping additional reactive particles may be performed. This may facilitate a thicker layer of reactive particles and/or engineered layers of different particle sizes and/or shapes.

In some situations, casing with desired patterns may be used on the outer surface to enable better trapping of the particles, improve bonding between cement and casing due to the modified surface roughness and/or the wettability of the surface. For example, prior to insertion into the wellbore, the casing may be processed, etched, or otherwise modified to increase the surface roughness and/or wettability of the surface, thereby improving adhesion of the reactive particles to the outer surface 114 of the casing 108. Such modification of the outer surface 114 of the casing 108 may occur in any manner, such as through chemical etching (e.g., application of an acidic or basic chemical to the outer surface 114 to etch the casing 108), mechanical etching (e.g., utilizing a mechanical etching mechanism, such as a mill or other system), abrasion (e.g., sand blasting, high speed or pressure application of hard particles to the outer surface 114 of the casing 108), or other mechanism to modify the outer surface 114 of the casing 108.

In some studies, it is known that $CO_2$ can react more readily with minerals that contain divalent ions such as calcium and magnesium. One option of the conditioning consists of adding magnesium-rich and/or iron-rich silicate (olivine) reactive particles to the spacer fluid. The particle size distribution and concentration may be tuned based on the formation hydrological properties of permeability and porosity as well as on the fluid that may be injected into (or produced from) the formation. Once the spacer is injected, the spacer fluid may be pressurized. This may facilitate improved integration of the reactive-particle-infused spacer fluid with the formation. For example, the spacer fluid may be pressurized with an injection pressure greater than the formation pressure to force the spacer fluid at least partially into the cracks of the formation.

As the cement is injected, a reactive particle-rich layer will interface between the cement and both sides of the micro annulus (e.g., at the formation and casing), which will bond with the cement and the formation. Further, in the presence of a corrosive environment (such as $CO_2$ saturated brines) this interface may have its porosity and permeability decreased. In this manner, the well cementing system 100 may mitigate any potential leaking pathways. As discussed herein, reactive particles that may be used in the spacer fluid or in the fluid between the spacer fluid and cement mix can be either olivine $(Mg, Fe)_2SiO_4$ particles or wollastonite ($CaSiO_3$) particles or brucite ($Mg(OH)_2$) particles.

Figures 1, 2:
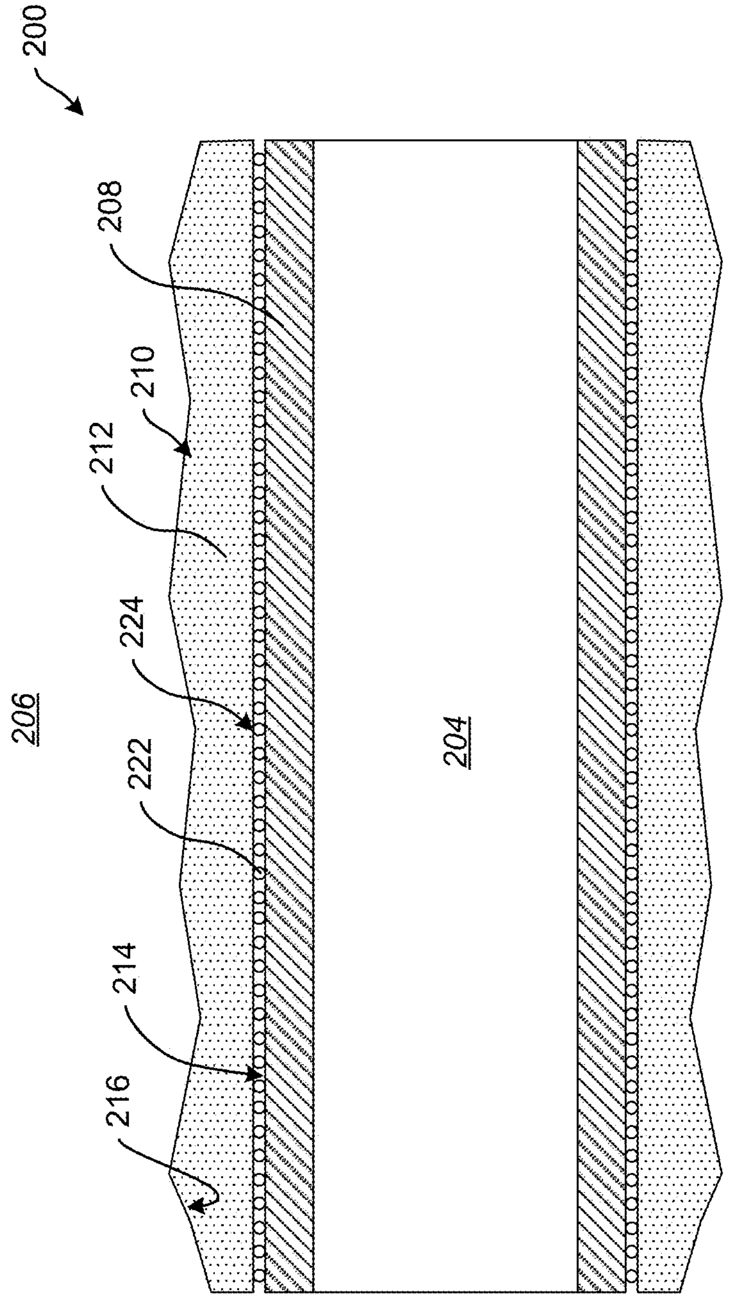
Figure 2:
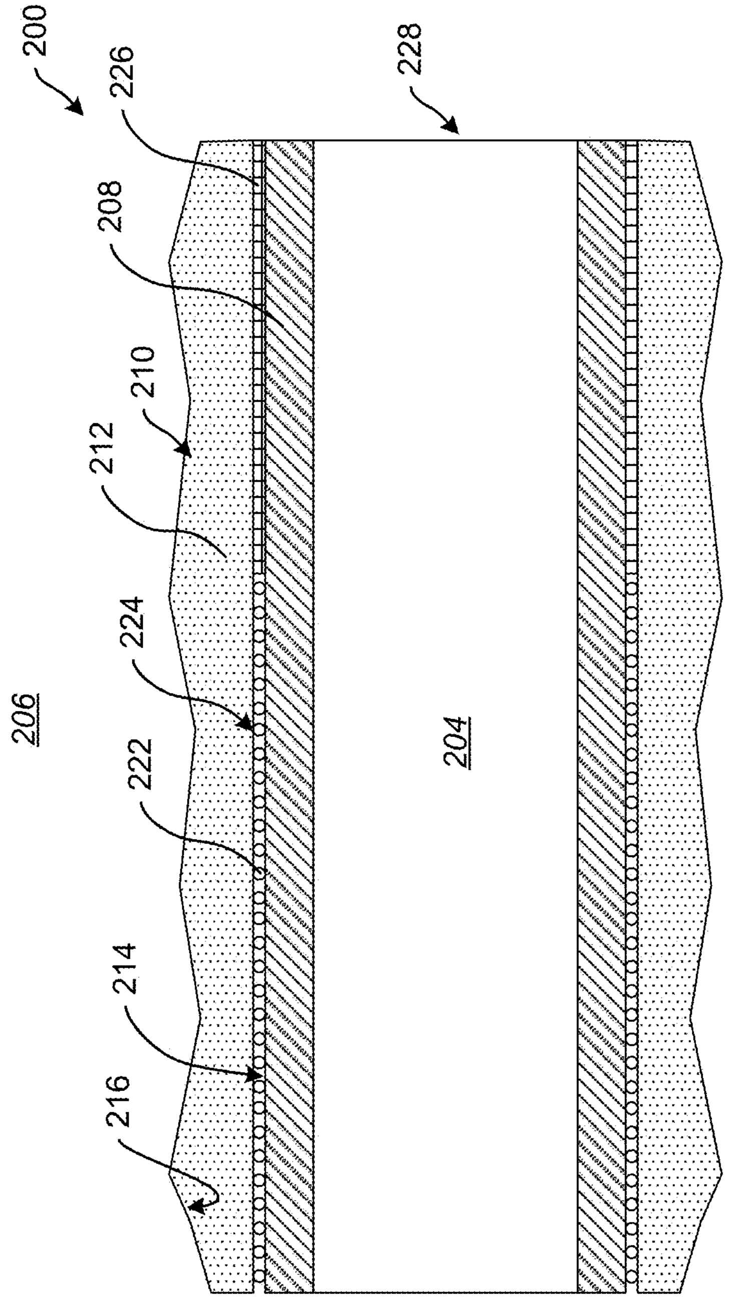
Figures 2, 3:
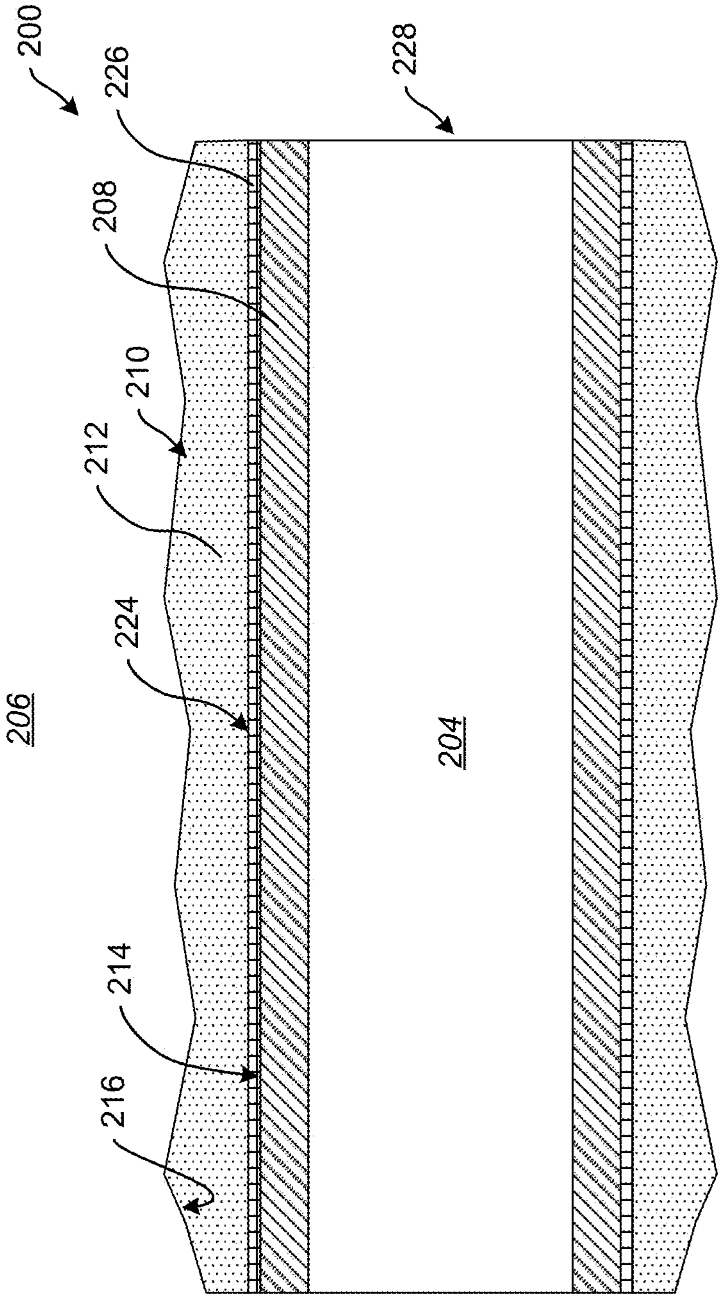
Figure 3:
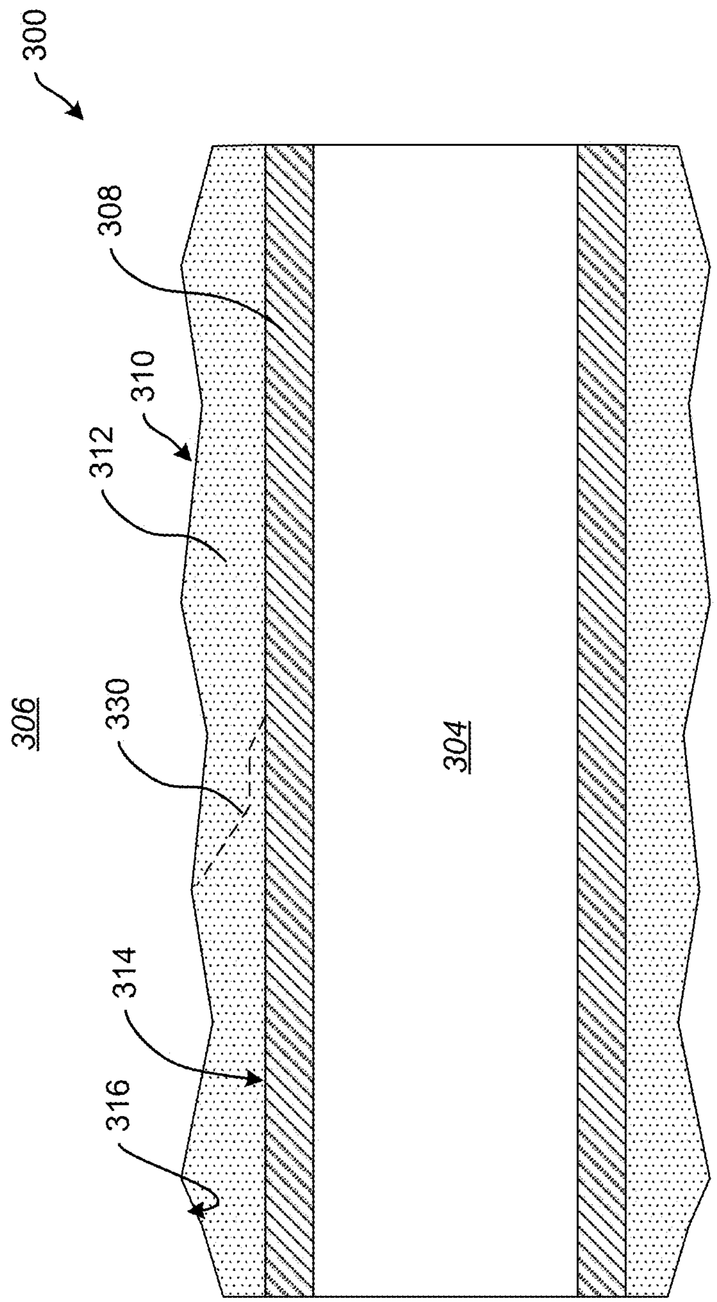

FIG. 2-1 through FIG. 2-3 include a representation of a well cementing system 200, according to at least one embodiment of the present disclosure. The well cementing system 200 includes a wellbore 204 lined with a casing 208. An annular space 210 is defined between the casing 208 and a formation 206. The casing 208 is cemented in place with a cement liner 212 in the annular space 210 between the casing 208 and the formation 206.

In FIG. 2-1, the wellbore 204 has to be conditioned with reactive particles 222. For ease of illustration, the reactive particles 222 are illustrated as enlarged, with exaggerated spacing, and having a circular cross-sectional shape. But it should be understood that the reactive particles 222 may be formed from any particle shape and have the particle sizes discussed herein. For example, the average particle size of the reactive particles 222 may be less than 1 μm. Further, the reactive particles 222 are illustrated as on an outer surface 214 of the casing 208. However, it should be understood that the reactive particles 222 may be located on any annular surface in the annular space 210 between the casing 208 and a wellbore wall 216 of the formation 206.

As discussed herein, in some situations, a micro annulus 224 may form in the annular space 210. For example, as illustrated in FIG. 2-1, the micro annulus 224 may be formed at the interface between the casing 208 and the cement liner 212. Micro annuli may be formed in any portion of the annular space 210, including at the interface between the cement liner 212 and the formation 206.

When the micro annulus 224 opens, forming a void space between the casing 208 and the cement liner 212, fluid including the reactant may enter into the micro annulus 224. For example, in a carbon sequestration well, $CO_2$ gas, supercritical $CO_2$, or water infused with $CO_2$ (e.g., carbonic acid) may infiltrate the micro annulus 224 by filling the void space of the micro annulus 224 when the micro annulus 224 opens. The reactant may contact the reactive particles 222 in the micro annulus 224. For example, the reactive particles 222 may include olivine or other divalent silicates, and the $CO_2$-rich fluid may contact the reactive particles 222. Such contact may cause a chemical reaction at the reactive particles 222, resulting in a reacted particle 226, as illustrated in FIG. 2-2. For example, contact of a $CO_2$-rich fluid with the olivine or other divalent silicates may cause the silicates to chemically react to form carbonates and other minerals.

The reacted particle 226 may have a higher volume than the reactive particles 222. For example, when the reactive particles 222 forms the reacted particles 226, the reactive particles 222 may swell. As illustrated in FIG. 2-2, this swelling may at least partially fill the micro annulus 224 with the reacted particles 226. In some situations, the reacted particle 226 may at least partially close the fluid passageway through the micro annulus 224. In some situations, the reacted particles 226 may completely close the fluid passageway through the micro annulus 224. This may re-seal the cement lining and/or prevent leaks from occurring.

While the embodiment illustrated in FIG. 2-2 shows the reacted particles 226 forming at a downhole end 228 of the wellbore 204, it should be understood that the reacted particles 226 may form at any location of the casing. For example, the casing 208 may include one or more cracks, holes, or other perforations that may allow the infiltration of the reactant into the annular space 210. In some examples, and as discussed herein, the reactant may infiltrate the annular space 210 via pathways through the casing 208, such as perforations for fracking and/or production of fluids from the formation 206.

In some situations, the reactive particles 222 may completely react with the reactant. For example, the reactive properties of the reactive particles 222 may be exhausted, the entirety of the reactive particles 222 may be reacted to form the reacted particles 226, the remaining amount of the material of the reactive particles 222 may be inaccessible to the reactant (such as by a shell of the mineral of the reacted particles 226 forming around a reactive particle 222), or the reactive particles 222 may be otherwise inaccessible to the reactant. In the embodiment illustrated in FIG. 2-3, the reactive particles 222 are exhausted, resulting in the reacted particles 226 completely filling the micro annulus 224.

In the embodiment illustrated in FIG. 2-3, the well cementing system 200 has sealed and/or prevented the formation of leaks in the wellbore 204. In this manner, the well cementing system 200 may facilitate the sealing or prevention of the formation of leaks at the wellbore 204 progressively. For example, the well cementing system 200 may seal leaks as they form. In some embodiments, the well cementing system 200 may seal leaks until the reactive particles 222 are exhausted, or have all reacted to form the reacted particles 226.

FIG. 3 is a representation of a well cementing system 300, according to at least one embodiment of the present disclosure. The well cementing system 300 includes a wellbore 304 lined with a casing 308. An annular space 310 is defined between an outer surface 314 of the casing 308 and wellbore wall 316 of a formation 306. The casing 308 is cemented in place with a cement liner 312 in the annular space 310 between the casing 308 and the formation 306.

In the embodiment illustrated in FIG. 3, a crack 330 has formed in the cement liner 312. The crack 330 may be formed in any manner. For example, the crack 330 may be formed based on geologic pressures from the formation 306, based on flaws in the cement liner 312, based on seismic activities in the formation 306, based on changes in the pressure of the wellbore 304, based on perforation activities at the wellbore 304, or other processes that may cause the crack 330.

In some situations, the crack 330 may cause leaks from the wellbore 304. For example, fluid from the wellbore 304 may exit the wellbore 304 and travel through the crack 330 to the surface, including through a network of cracks 330, cracks in the formation 306, or a combination of micro annuli (as discussed herein) and cracks 330.

In accordance with at least one embodiment of the present disclosure, when the crack 330 is detected (such as by detecting the leak at the surface or detecting a change in pressure of the wellbore 304) or suspected of being present, the well cementing system 300 may facilitate the injection of the reactive particles into the wellbore 304. For example, the reactive particles may be mixed with a carrier fluid, and the carrier fluid may be pumped into the wellbore 304. The carrier fluid may be pumped with a sufficient pressure to allow the carrier fluid containing the reactive particles to infiltrate the crack 330. When the carrier fluid is drained or removed from the wellbore 304, the reactant may infiltrate the crack 330, react with the reactive particles, and cause the reactive particles to swell. This may seal off or close the crack 330, and reduce or prevent leaks through the crack 330. In this manner, the reactive particles may be used in remedial operations to seal cracks that have formed in the cement liner 312.

In some embodiments, the reactive particles may be used in remedial operations in wells that were pre-conditioned with the reactive particles. For example, in some situations, when the reactive particles are exhausted, cracks 330 and/or additional micro annuli may form in the annular space 310. When these additional cracks 330 or additional micro annuli are detected or inferred, the carrier fluid may be pumped into the wellbore 304 and pressurized to infiltrate the newly formed cracks and/or micro annuli. In this manner, cracks in a pre-conditioned wellbore may be further closed.

In some situations, the reactive particles discussed herein may be used to impregnate the cement liner 312. For example, the reactive particles discussed herein may be mixed with the cement slurry pumped in the annular space 310 to form the cement liner 312. When a crack 330 in the cement liner 312 forms, the reactive particles in the cement liner 312 may be exposed on the surfaces of the crack 330. The reactant may infiltrate the crack 330, and the exposed reactive particles may react with the reactant, thereby swelling and at least partially closing off the crack 330. In some embodiments, the reactive particle-impregnated cement may be used in conjunction with the pre-conditioning and/or remedial techniques discussed herein. In this manner, the well cementing system 300 may reduce the likelihood and/or impact of leaks at the wellbore 304.

Figure 4:
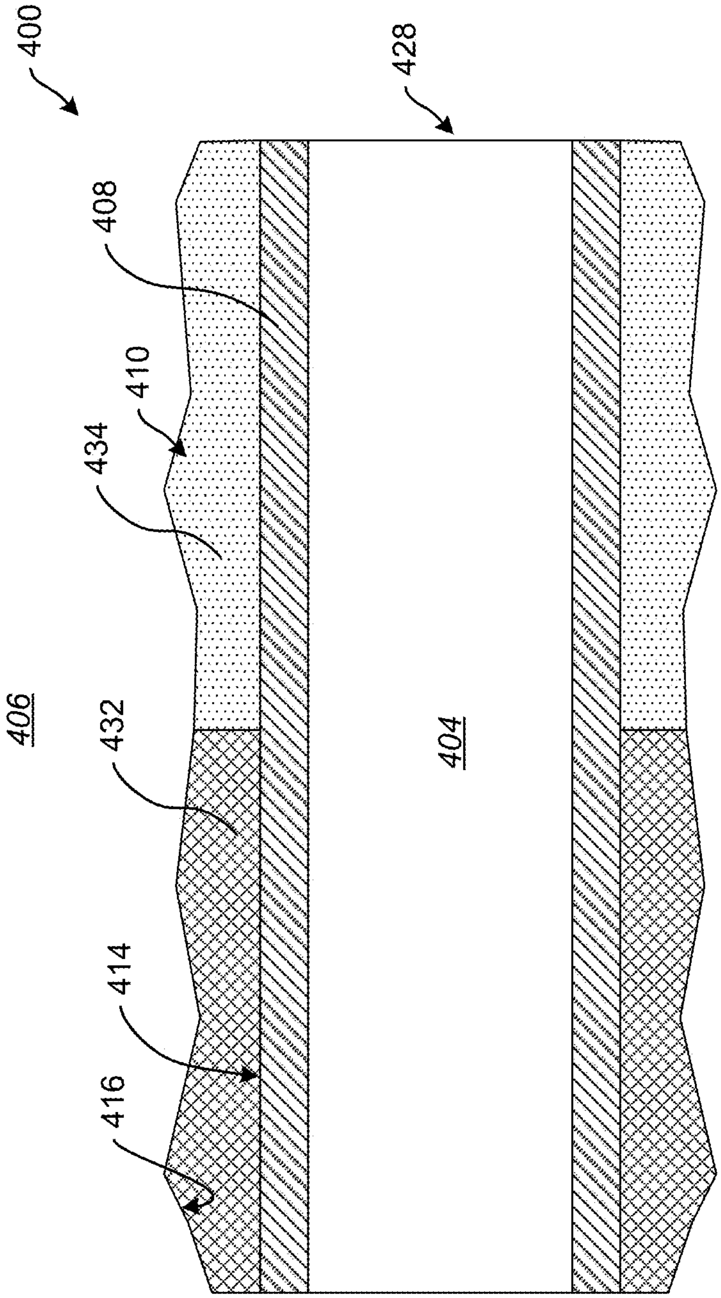
FIG. 4 is a representation of a well cementing system, according to at least one embodiment of the present disclosure.

FIG. 4 is a representation of a well cementing system 400, according to at least one embodiment of the present disclosure. The well cementing system 400 includes a wellbore 404 lined with a casing 408. An annular space 410 is defined between an outer surface 414 of the casing 408 and wellbore wall 416 of a formation 406.

As discussed herein, the wellbore 404 may be preconditioned with reactive particles. To condition the wellbore 404, a carrier fluid 432 may be flowed into the annular space 410. The carrier fluid 432 may include a fluid that is mixed with the reactive particles. The reactive particles may be selected and formulated to be compatible with the carrier fluid 432. For example, the reactive particles may be non-reactive with the carrier fluid 432. The carrier fluid 432 may include any type of carrier fluid. For example, the carrier fluid may include a polymer selected and formulated to be deposited at or otherwise form a film or coating on the outer surface 414 of the casing 408 and/or the wellbore wall 416 of the formation 406. In some embodiments, the carrier fluid may be any fluid that has affinity to the casing and/or to the formation to apply a coating on them. The carrier fluid may be hydrophilic to facilitate coating on steel. In some embodiments, the carrier fluid may be amphiphilic or hydrophobic, based on the conditions of the casing, the cement liner, or the formation. In some embodiments, the carrier fluid may be the same or different for different applications, including on different sides (e.g., casing side or formation side) of the cement liner. The carrier fluid or reactive particles may be polymer based, or surfactant based, or a combination thereof. In some embodiments, based on the roughness of the outer casing, the carrier fluid may include water. In some embodiments, the viscosity of the carrier fluid may be sufficiently low to facilitate flow through the annuli.

In some embodiments, the carrier fluid 432 may be flowed through the annular space 410 and then drained from the annular space 410. This may coat or apply a coating or film of the carrier fluid 432 including the reactive particles on the outer surface 414 of the casing 408 and the wellbore wall 416 of the formation 406. In some embodiments, a second carrier fluid 432 may then be flowed through the annular space 410 to apply a second coating on top of the first coating. In some embodiments, an inert gas may be flowed through the annular space 410 to set the coating or film.

In some embodiments, the carrier fluid 432 may be a spacer fluid. The spacer fluid may be flowed into the annular space 410 prior to cementing the casing 408 in place. To cement the casing 408 and install a cement liner, a cement slurry 434 may be flowed into the annular space 410. For example, the cement slurry 434 may be flowed into the annular space 410 from a downhole end 428 of the wellbore 404. Flowing the cement slurry 434 into the annular space 410 may displace the carrier fluid 432. In some embodiments, displacing the carrier fluid 432 may leave a coating of deposited reactive particles on the outer surface 414 of the casing 408 and/or the wellbore wall 416 of the formation 406. When the cement slurry 434 cures to form the cement liner, the coating of the reactive particles may remain in place. In this manner, when micro annuli form, the deposited reactive particles may be exposed to and react with the reactant, swell, and close the formed micro annuli.

Figure 5:
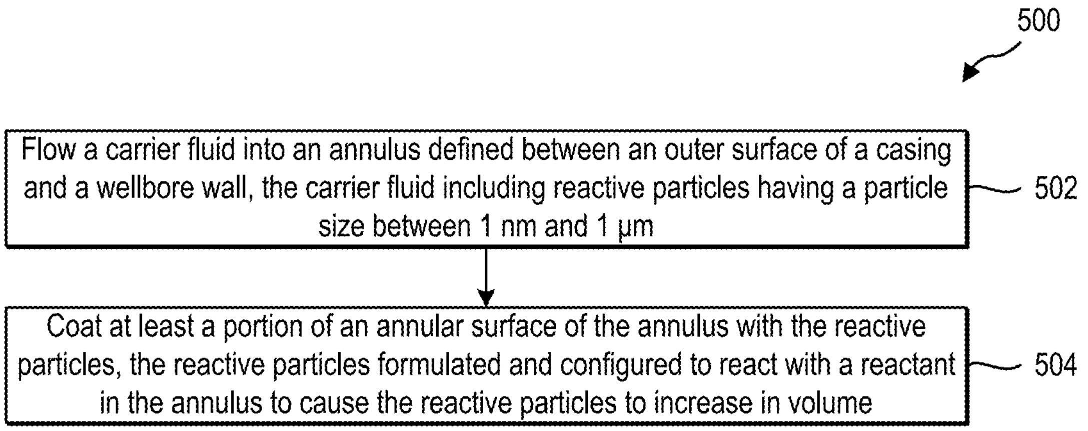
FIG. 5 is a flowchart of a method for annular crack mitigation in a wellbore, according to at least one embodiment of the present disclosure.

FIG. 5 is a flowchart of a method 500 for annular crack mitigation in a wellbore, according to at least one embodiment of the present disclosure. The method 500 may include flowing a carrier fluid into an annulus defined between an outer surface of a casing and a wellbore wall at 502. The carrier fluid includes reactive particles having a particle size between 1 nm and 1 μm. The method 500 may further include coating at least a portion of an annular surface of the annulus with the reactive particles at 504. The reactive particles are formulated and configured to react with a reactant in the annulus to cause the reactive particles to increase in volume. In some embodiments, flowing the carrier fluid may include flowing the carrier fluid into cracks in the cement liner of the annulus. In some embodiments, the carrier fluid may be pressurized during or after flowing the carrier fluid into the wellbore.

As discussed herein, the reactive particles may be reactive to carbon dioxide ($CO_2$). In some embodiments, the reactive particles may include olivine. In some embodiments, the carrier fluid may include a polymer selected to be adhesive to the outer surface of the casing. In some embodiments, the reactive particles may have a spherical shape. In some embodiments, the wellbore may include a $CO_2$ storage wellbore.

In some embodiments, the method 500 may further include flowing a cement slurry into the annulus after flowing the carrier fluid into the annulus and coating the portion of the annular surface with the reactive particles. In some embodiments, the cement slurry may include the reactive particles mixed into the cement slurry. In some embodiments, flowing the cement slurry into the annulus includes displacing the carrier fluid with the cement slurry. In some embodiments, before flowing the cement slurry into the annulus, the annulus may be flushed with nitrogen gas.

In some embodiments, the carrier fluid includes a first carrier fluid and a second carrier fluid. The reactive particles may include first reactive particles and second reactive particles. The well cementing system may flow the first carrier fluid having the first reactive particles to a first section of the wellbore and flow the second carrier fluid having the second reactive particles to a second section of the wellbore. The first reactive particles and the second reactive particles may have at least one of a different shape or a different particle size range. In some embodiments, the first section includes a perforation section. The first carrier fluid may have a first concentration of the first reactive particles that is greater than a second concentration of the second reactive particles in the second carrier fluid. In this manner, the coatings at the wellbore may be tailored to the different sections of the wellbore.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for annular crack mitigation in a wellbore, the method comprising:

flowing a first carrier fluid and a second carrier fluid into an annulus defined between an outer surface of a casing and a wellbore wall, the first carrier fluid including first reactive particles and the second carrier fluid including second reactive particles, at least one of the first reactive particles or the second reactive particles having a particle size between 1 nm and 1 μm, wherein flowing the first carrier fluid and the second carrier fluid includes:

flowing the first carrier fluid including the first reactive particles to a first section of the wellbore, the first section including a perforation section, and the first carrier fluid having a first concentration of the first reactive particles that is greater than a second concentration of the second reactive particles in the second carrier fluid; and flowing the second carrier fluid including the second reactive particles to a second section of the wellbore, the first reactive particles and the second reactive particles having at least one of a different shape or a different particle size range; and coating at least a portion of an annular surface of the annulus with the first and second reactive particles, the first and second reactive particles formulated and configured to react with a reactant in the annulus to cause the first and second reactive particles to increase in volume.

2. The method of claim 1, further comprising flowing a cement slurry into the annulus after flowing the first carrier fluid and the second carrier fluid into the annulus and coating the portion of the annular surface with the first and second reactive particles.

3. The method of claim 2, wherein the cement slurry includes additional reactive particles mixed into the cement slurry.

4. The method of claim 2, wherein flowing the cement slurry into the annulus includes displacing the first carrier fluid and the second carrier fluid with the cement slurry.

5. The method of claim 2, further comprising, before flowing the cement slurry into the annulus, flushing the annulus with an inert gas.

6. The method of claim 1, wherein the first and second reactive particles are reactive to carbon dioxide ($CO_2$).

7. The method of claim 6, wherein the first and second reactive particles include olivine.

8. The method of claim 1, wherein flowing the first carrier fluid and the second carrier fluid includes flowing at least one of the first carrier fluid or the second carrier fluid into cracks in a cement liner.

9. The method of claim 1, further comprising pressurizing the first carrier fluid and the second carrier fluid after flowing the first carrier fluid and the second carrier fluid.

10. The method of claim 1, wherein at least one of the first carrier fluid or the second carrier fluid includes a polymer selected to be adhesive to the outer surface of the casing or the wellbore wall.

11. The method of claim 1, wherein at least one of the first reactive particles or the second reactive particles has a spherical shape.

* * * * *